April 2, 1957 S. D. RUSSELL 2,787,208
SALT DISPENSER FOR HAY BALERS
Original Filed March 21, 1945
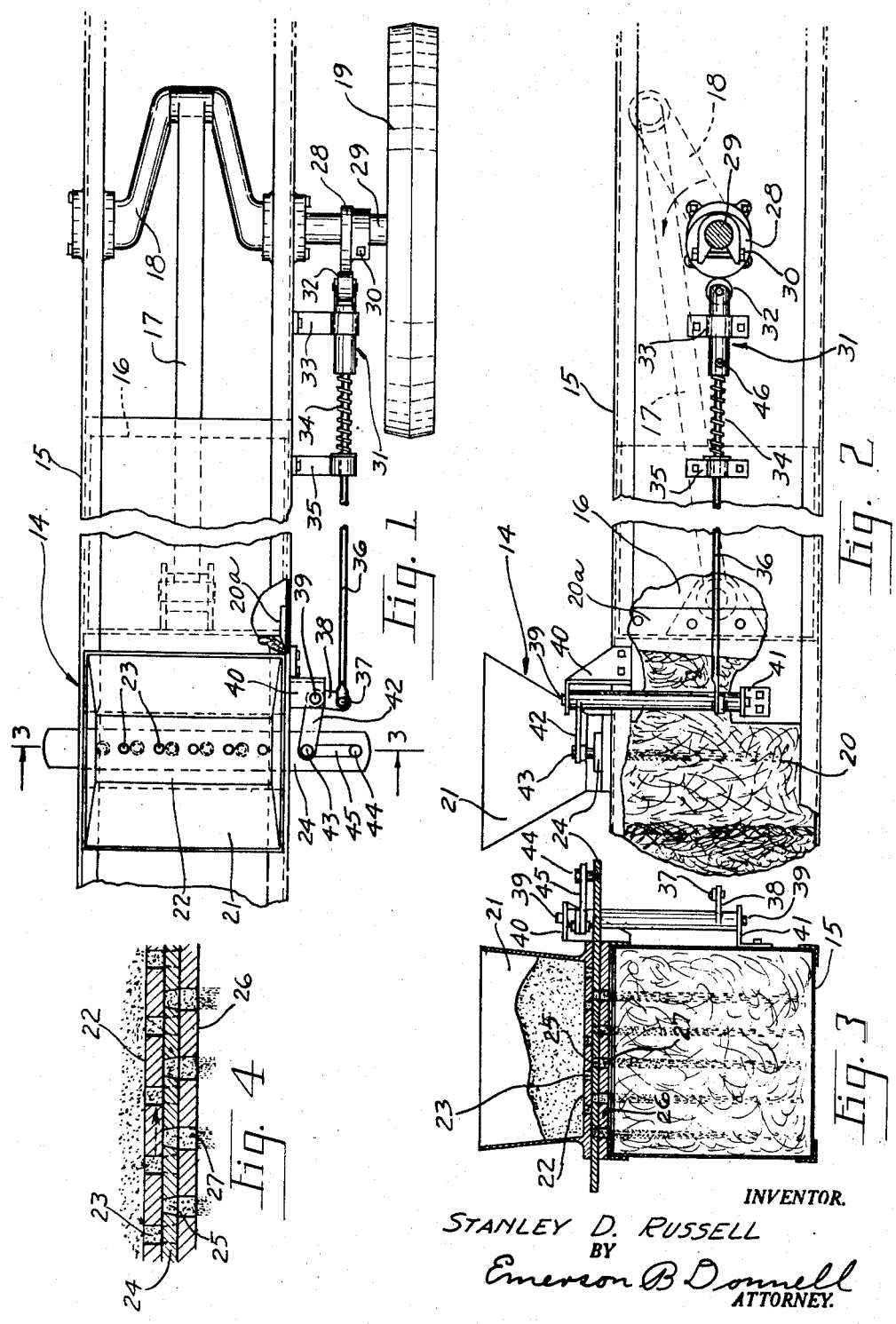
INVENTOR.
STANLEY D. RUSSELL
BY
Emerson B Donnell
ATTORNEY.

United States Patent Office 2,787,208
Patented Apr. 2, 1957

2,787,208

SALT DISPENSER FOR HAY BALERS

Stanley D. Russell, Racine, Wis., assignor to J. I. Case Company, Racine, Wis., a corporation of Wisconsin Original application March 21, 1945, Serial No. 583,955, now Patent No. 2,503,416, dated April 11, 1950. Divided and this application March 28, 1950, Serial No. 152,415

1 Claim. (Cl. 99—235)

The present invention relates to mechanism for harvesting forage crops and an object thereof is to generally improve the construction and operation of such mechanism, and specifically to a salt dispenser for hay balers.

This application is a division of application to Russell, Serial No. 583,955, filed March 21, 1945 for Method of Harvesting Forage Crops, which issued as Patent No. 2,503,416 on April 11, 1950.

Further objects are to provide apparatus for adding a modifying substance during a crop treating operation and which embraces mechanism for feeding such substance at a rate in proportion to the rate of treating of the crop.

Further objects are to provide expedients for the realization of the above objects.

The storage of forage crops, such as hay and the like, with the addition of salt or other preservatives or flavoring material, has long been known, the procedure being to build a hay stack by first placing a thin layer of hay on the ground, sprinkling it with the salt or other substance, placing a second layer of hay on the first layer, sprinkling the second layer with salt, placing a third layer, sprinkling with salt, etc., until a stack of the desired size is built, the salt being distributed more or less evenly through the stack. However, the layers have appreciable thickness, and there is no particular uniformity in applying the salt or substance and the whole process involves a large amount of labor and is influenced by the variations and failures common to manual processes. Furthermore, the completed stack is subject to the vagaries of the weather and involves the usual difficulty in feeding the finished crop. The means of the present invention results in the incorporation of a modifying substance with substantially perfect uniformity and substantially constant proportion and also in a crop in final form which is particularly convenient to store or feed or ship to distant points.

Further objects and advantages of the invention will become apparent from a consideration of the following detailed description taken in connection with the accompanying drawings wherein a satisfactory example of the invention is shown. However, it is to be understood that the invention is not limited to the details disclosed but includes all such variations and modifications as fall within the spirit of the invention as herein expressed in the annexed claim.

In the drawings, Figure 1 is a plan view of so much of a baler as necessary to illustrate one embodiment of the invention.

Fig. 2 is a right side elevation of the same with parts broken away.

Fig. 3 is a vertical sectional view taken on the line 3—3 of Fig. 1.

Fig. 4 is an enlarged detail of a portion of Fig. 3.

As illustrating a typical example of a baler equipped with the feeder 14, Fig. 1 shows a baler having a case of well-known form 15 in which is reciprocable a plunger 16 actuated by a pitman 17 from a crank 18, crank 18 being driven by a flywheel or other suitable or well-known means 19. It is to be understood that the baler will be provided with conventional or suitable driving means, transporting wheels, feeding devices, etc., essential to successful operation, and forming no part of the present invention and therefore not necessary to further describe or illustrate. The baler, however, is provided with a feed opening 20 in the present instance located in one side of chamber 15 and through which the crop is introduced at such times as opening 20 is not covered by plunger 16. It is to be understood that a plunger 16 reciprocates so as to alternately cover and uncover opening 20 in the manner fully set forth in applicant's Patent No. 2,362,861, a knife 20ª being fixed on plunger 16 for slicing or dividing the separate feeds.

Feeder 14 is arranged to deposit, periodically a small amount of salt, lime or other crop treating material as hereinbefore stated in timed relation to the reciprocations of plunger 16. As will be apparent, much of the time the material will be so tightly compressed in front of plunger 16 that granular material could not penetrate to any extent into the compressed material. However, between these periods, the crop will be comparatively loose, for example when plunger 16 has been retracted and has not yet returned on a compressing stroke, as indicated in Figs. 1 and 2. Material introduced substantially in line with opening 20 at this period, will have an appreciable time interval in which to move partly or substantially entirely through the body of material so as to permeate it thoroughly. The treating material is substantially immediately trapped by the following compressing stroke of plunger 16, the crop tightening about the material and preventing further movement thereof. This action is repeated for each feed or compressing stroke of plunger 16. Therefore, if the salt or treating material should be unable to penetrate the crop in a perfectly uniform manner, at least there will be one "feed" of salt for or within each "feed" of hay. In other words, the salt or treating material is fed in timed relation to the feeding of the hay, and is trapped between, or at the junctions of said feeding. For all practical purposes, this would be homogeneous distribution of the salt throughout the hay. This constitutes an important phase of the invention.

For achieving this result, feeder 14 comprises a hopper portion 21 in the present instance located on top of the bale case 15 substantially in line with a portion of opening 20. Hopper 21 is of a size to hold enough salt or other treating material for a reasonably long run of the baler. Hopper 21 has a bottom wall 22 providing a series of openings 23, as more particularly indicated in Figs. 3 and 4 and which will remain filled with salt from the supply carried in the hopper. A feeding or measuring plate 24 is shiftable beneath openings 23 and contains a series of openings 25 which may register with openings in a plate 26 spaced from bottom wall 22 sufficiently to allow free movement of plate 24. Openings 25 are preferably downwardly flared to facilitate discharge of the treating material. Plate 26 is provided with openings 27 which may register in one position with above mentioned openings 25. Above mentioned openings 25 in another position register with above mentioned openings 23. Thus, as will be understood, in one position of plate 24, openings 25 will receive salt or treating material from openings 23. Shifting of plate 24 will then transfer this measured amount of material to openings 27 through which the material will be dropped into bale case 15. In the present instance, plate 24 is reciprocable between plates 22 and 26. As will be apparent, it is necessary that the registration of opening 25 with openings 27 must occur in timed relation to the reciprocations of plunger 16 so that the salt will be dropped into the bale case only at such times as the hay is in condition to receive it. It is contemplated that this may be accomplished in any suitable way within the scope of certain phases of the invention, in the illustrated embodiment, plate 24 being shifted from a cam 28 actuated from crank shaft 18.

Cam 28 in the present instance is adjustably fixed on a shank portion 29 by a clamping screw 30 and actuates a follower generally designated as 31 provided with a roller 32. The action of the cam reciprocates follower 31 in a guide 33 carried by bale case 15, a spring 34 bearing against a suitable abutment 35, pressing follower 31 and roller 32 against cam 28. Follower 31 actuates a push rod 36 pivoted at 37 to an arm 38 of a bell crank fulcrumed on a pivot 39. Pivot 39 is carried in brackets 40 and 41 supported on bale case 15 and an arm 42 connects a pivot 43 with a pivot 44 on plate 24 by means of a link 45. In this manner, rotation of cam 28 will cause reciprocation of plate 24 in timed relation to the rotations of crank 18.

Different conditions may require different amounts of salt or other treating material. This may be accomplished by exchanging plate 24 for one with openings the required size for the desired feed rate, pivot 44 being readily removable for this purpose. Alternatively, push rod 36 is adjustably connected with follower 31 as by a set screw 46. Adjusting rod 36 in relation to follower 31 will change the range of movement of plate 24, resulting in only a partial registration of openings 25 with openings 23 and 27. This will limit the amount of material which may be fed into the hay or other crop during the comparatively short interval that the openings are in registration.

Once the correct timing or relation between the reciprocations of plate 24 and the reciprocations of plunger 14 is determined, it should be seldom necessary to change it. However, if such adjustment is necessary, it is a simple matter to loosen clamp screw 30 and shift cam 28 in relation to shank 29 until the correct timing is obtained.

In the practice of the invention by the above described apparatus, it is contemplated that other materials than salt, lime, etc., may be added to the material being treated. For example, any of the small grains which it is desired to blend with the baled or chopped, or otherwise treated material, may be placed in the hopper 21 or the hopper 54 and fed in measured quantities into the crop being harvested.

The manner in which the objects of my present invention are accomplished will be apparent from the foregoing specification. No effort, however, has been made to go into exact detail of construction and assembly, as the ultimate details will necessarily have to be determined by the character of service for which the device is employed.

The operation is thought to be clear from the above description and what is claimed as new and desired to be secured by Letters Patent of the United States is:

In a forage harvester the combination of a baler having a baling chamber, a hay compressing plunger reciprocable in said chamber for compressing hay in a succession of feeds for each bale, an opening in said chamber through which loose hay is introduced into the space in which said plunger reciprocates prior to each compression stroke of the plunger cutting means on said plunger for severing the several feeds from each other, and a feeding device on the baler positioned above said space and communicating therewith through a separate opening substantially in a line with the first-named opening providing a supply of a preservative substance, and said device including means timed in relation to the reciprocations of said plunger and disposed to direct a quantity of said preservative substance into the space just prior to each successive compression stroke of the plunger for substantially uniformly distributing the substance throughout the resulting bale.

References Cited in the file of this patent
UNITED STATES PATENTS

| | | |
|---|---|---|
| 506,892 | Wiebe | Oct. 17, 1893 |
| 513,940 | Kelly | Jan. 30, 1894 |
| 2,293,679 | Barker | Aug. 18, 1942 |
| 2,405,507 | Lefren | Aug. 6, 1946 |
| 2,565,422 | Edwards | Aug. 21, 1951 |
| 2,567,760 | Boughan | Sept. 11, 1951 |